(No Model.)

S. JAMES.
FILTER.

No. 284,428. Patented Sept. 4, 1883.

WITNESSES:
Theo. G. Hoster
C. Sedgwick

INVENTOR:
S. James
BY Munn & Co.
ATTORNEYS.

UNITED STATES PATENT OFFICE.

SAMUEL JAMES, OF LEBANON, MISSOURI.

FILTER.

SPECIFICATION forming part of Letters Patent No. 284,428, dated September 4, 1883.

Application filed May 4, 1883. (No model.)

*To all whom it may concern:*

Be it known that I, SAMUEL JAMES, of Lebanon, in the county of Laclede and State of Missouri, have invented a new and Improved Filter, of which the following is a full, clear, and exact description.

My invention consists of a simple filter or strainer attachment for rain-water conductors, adapted to be fitted in the conductors, where the water escaping from the roof will have to pass through said filter before discharging into the cistern, to be relieved of the bugs and other insects, also other matters, for which a dead-water receptacle is provided in said filter, where they lodge, so that the water flowing through the filter does not pass through them, and is therefore not affected by them, the said filter being readily detachable from the conductor for removing the deposits accumulating in it, all as hereinafter fully described.

Reference is to be had to the accompanying drawings, forming a part of this specification, in which similar letters of reference indicate corresponding parts in all the figures.

Figure 1:
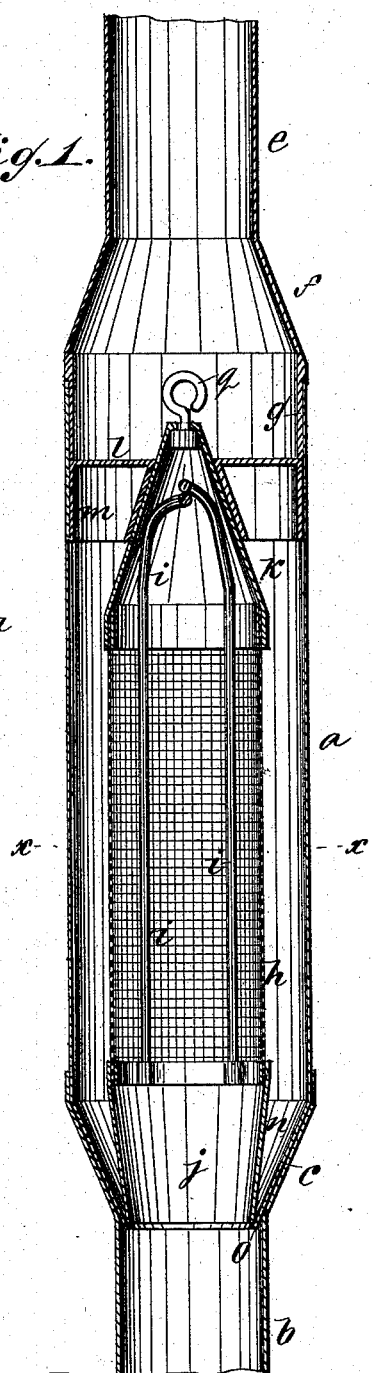
Figure 2:
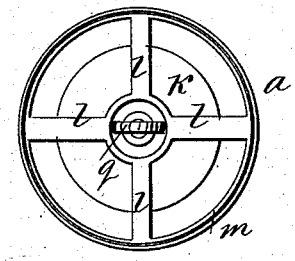
Figure 3:
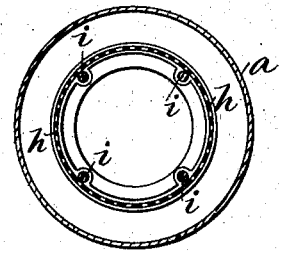

Figure 1 is a sectional elevation of my improved filter. Fig. 2 is a top view of the filter attachment disconnected from the conductor, and Fig. 3 is a transverse section of the filter.

I take a short section of sheet metal or other tubing of about double the transverse section of the rain-water conductor, or thereabout, and permanently connect a nipple, $b$, to one end by a tapered or other shaped reducer, $c$, of any approved contrivance, and fit a similar nipple, $e$, on the other end by another reducer, $f$, to which another nipple, $g$, is attached, that fits closely but detachably in the upper end of the tube-section $a$, for opening and closing the filter when required, of which the said tube-section $a$ forms the case. Within this case I arrange a short section of wire-gauze tube, $h$, of about the same size as the conductor and the connecting-nipples, and a little shorter than the case, said gauze tube $h$ being suitably ribbed inside with wires $i$, to prevent it from collapsing, and having a slightly-tapered sheet-metal nipple, $j$, at the lower end, that forms a suitably tight but detachable connection with the taper nozzle $o$ of the lower end of the case $a$ by dropping the said nozzle. The upper end of the gauze tube has a taper cap, $k$, of sheet metal, closing said end to the water, and the cap is centered in a spider-frame, $l$, that drops into the case $a$, to hold the upper end of the gauze tube in position, thus making a simple and practicable filter that may be readily connected in a rain-water conductor by cutting out a short section of the conductor. In the filter an annular pocket, $n$, is formed between nipple $j$ and taper nozzle $o$ of the case, where all solid matters separated from the water by the filter will deposit below the wire-gauze, and also below the flowing water passing through the gauze, so that the water is not contaminated by the foul matters separated from it.

The filter is to be detached by shifting the filter or the conductor above it lengthwise sufficiently to allow nipple $g$ to be drawn out of the upper end of the case $a$, for which the support of the filter may be so fixed that it can be taken away or lowered to allow the filter to be dropped down sufficiently.

If desired, the filter may be connected directly to the tile or cover of the cistern, instead of being located higher up and having a pipe-section below it.

The cap $k$ is provided with an eye-stud, $q$, to lift the gauze-tube $h$ out with by the fingers or a hook.

It is to be understood that the diameter of wire-gauze tube $h$ is to be sufficiently less than that of the case to afford about the same space for the descent of the water as the space of the conductor.

It may at times be undesirable to use the protecting-cap $k$ to the top of the gauze tube, as it may be better to have the gauze tube finished with a gauze top, in which case a wire bail may be attached, instead of the eye-stud $q$, for a device to lift the gauze tube out with, and a loosely-wound spiral wire may be substituted for the rods $i$, to keep the gauze tube $h$ expanded.

Having thus described my invention, I claim as new and desire to secure by Letters Patent—

1. The combination, in a filter, of the case $a$ with wire-gauze tube $h$, the gauze tube being arranged within the case, and having a nipple at the lower end, said nipple connecting with the nozzle of the case to form a dead-water space, $n$, below the wire-gauze, substantially as described.

2. In combination, the case $a$, wire-gauze tube $h$, nipple $j$, and the spider $l$, the case having a taper nozzle, $o$, in which the nipple $j$ forms a detachable joint, and the spider $l$ being removable from the case, said case also being fitted with pipe-connections at the ends, substantially as described.

SAMUEL JAMES.

Witnesses:
I. P. WIXON,
J. D. BOHANNON.